US012366093B2

(12) United States Patent
Chen et al.

(10) Patent No.: US 12,366,093 B2
(45) Date of Patent: Jul. 22, 2025

(54) SLIDE RAIL MECHANISM AND ADJUSTMENT DEVICE THEREOF

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shih-Lung Huang, Kaohsiung (TW); Yi-Syuan Jhao, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 280 days.

(21) Appl. No.: 18/201,721

(22) Filed: May 24, 2023

(65) Prior Publication Data

US 2024/0309681 A1 Sep. 19, 2024

(30) Foreign Application Priority Data

Mar. 16, 2023 (TW) ................................ 112110145

(51) Int. Cl.

*E05B 65/465* (2017.01)
*A47B 88/447* (2017.01)
*A47B 88/49* (2017.01)

(52) U.S. Cl.

CPC .......... *E05B 65/465* (2013.01); *A47B 88/447* (2017.01); *A47B 88/49* (2017.01); *A47B 2210/007* (2013.01)

(58) Field of Classification Search

CPC .. E05B 65/465; E05B 63/0056; E05B 65/464; A47B 88/447; A47B 88/49; A47B 2210/007; A47B 67/04; A47B 88/50; A47B 97/00; A47B 2097/008

See application file for complete search history.

(56) References Cited

U.S. PATENT DOCUMENTS

| | | | | |
|---|---|---|---|---|
| 533,949 A | | 2/1895 | Fogerty | |
| 5,333,949 A | * | 8/1994 | McGregor | E05B 65/464 312/221 |
| 6,296,332 B1 | * | 10/2001 | Lammens | E05B 65/464 312/217 |
| 6,543,318 B1 | * | 4/2003 | Erickson | B23B 31/1077 409/234 |
| 6,550,876 B2 | | 4/2003 | Lammens | |

(Continued)

FOREIGN PATENT DOCUMENTS

| | | | |
|---|---|---|---|
| CN | 115104867 A | * | 9/2022 |
| CN | 217510123 U | | 9/2022 |

(Continued)

*Primary Examiner* — Hanh V Tran
(74) *Attorney, Agent, or Firm* — Winston Hsu

(57) ABSTRACT

An adjustment device of a slide rail mechanism includes a base, a driving member and an adjusting member. The adjusting member is arranged on the base. The adjusting member is configured to be adjusted for moving the driving member. The adjustment device can be used with a working member to form an interlock mechanism. The interlock mechanism only allows a rail of one of the slide rail assemblies of the slide rail mechanism to be opened.

13 Claims, 10 Drawing Sheets

(56) References Cited

U.S. PATENT DOCUMENTS

| | | | | | |
|---|---|---|---|---|---|
| 7,101,001 | B1 * | 9/2006 | Chiu | E05B 65/464<br>312/217 |
| 7,320,507 | B2 * | 1/2008 | White | E05B 65/464<br>312/217 |
| 7,334,293 | B2 * | 2/2008 | Erickson | E05D 7/0423<br>16/245 |
| 7,695,080 | B2 * | 4/2010 | Chen | A47B 88/427<br>312/334.4 |
| 7,823,992 | B2 | 11/2010 | Chen | |
| 8,308,251 | B2 * | 11/2012 | Liang | A47B 88/463<br>312/319.1 |
| 8,540,328 | B2 * | 9/2013 | Chen | A47B 88/57<br>312/333 |
| 12,221,812 | B2 * | 2/2025 | Xu | A47B 88/50 |
| 2024/0245213 | A1 * | 7/2024 | Chen | A47B 88/49 |

FOREIGN PATENT DOCUMENTS

| | | | | | |
|---|---|---|---|---|---|
| CN | 218074140 | U | * | 12/2022 | |
| CN | 116831400 | A | * | 10/2023 | |
| CN | 118415458 | A | * | 8/2024 | |
| EP | 1348826 | A2 | * | 10/2003 | E05D 7/0423 |
| EP | 2042674 | A1 | * | 4/2009 | E05D 5/14 |
| EP | 3 064 680 | A1 | | 9/2016 | |
| JP | 5-63349 | U | | 8/1993 | |
| JP | 10-57168 | A | | 3/1998 | |
| JP | 3236470 | U | | 2/2022 | |

* cited by examiner

SLIDE RAIL MECHANISM AND ADJUSTMENT DEVICE THEREOF

BACKGROUND OF THE INVENTION

1. Field of the Invention

The present invention relates to an adjustment device, and more particularly, to an adjustment device applied for a slide rail mechanism.

2. Description of the Prior Art

U.S. Pat. No. 5,333,949 discloses a drawer interlock mechanism, which is used for a cabinet including a plurality of drawers. The interlock mechanism prevents multiple drawers from being pulled-open at the same time, thereby preventing the cabinet from toppling over. The interlock mechanism includes a plurality of control rods; when one of the drawers is pulled-open, the control rods are activated to prevent the other drawers from being pulled out of the cabinet. In addition, the control rods achieve a tightening effect in a specific direction through at least one spring.

However, design of a different product of satisfying diversified needs of the consumer market is an important issue in the mechanical design industry.

SUMMARY OF THE INVENTION

The present invention provides an adjustment device applied for a slide rail mechanism and having advantages of simple structure and easy operation for solving above drawbacks.

According to the claimed invention, an adjustment device includes a base, a driving member and an adjusting member. The adjusting member is arranged on the base and configured to adjust a movement of the driving member.

According to another claimed invention, a slide rail mechanism is provided to have an interlock function, and the interlock function has an adjustment mechanism.

According to another claimed invention, a slide rail mechanism includes a first slide rail assembly, a second slide rail assembly, an adjustment device, an auxiliary device and a working member. The first slide rail assembly includes a first rail and a second rail, and the second rail is shiftable with respect to the first rail. The second slide rail assembly includes a third rail and a fourth rail, and the fourth rail is shiftable with respect to the third rail. The adjustment device is movably mounted on the first slide rail assembly. The auxiliary device is movably mounted on the second slide rail assembly. The working member is arranged between the adjustment device and the auxiliary device. When the second rail is shifted with respect to the first rail in an actuation direction, the adjustment device and the working member and the auxiliary device are linked for utilizing the auxiliary device to block the fourth rail, so as to prevent the fourth rail from being shifted with respect to the third rail in the actuation direction. One of the adjustment device and the auxiliary device comprises an adjusting member, and the working member is drivable in response to adjustment of the adjusting member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
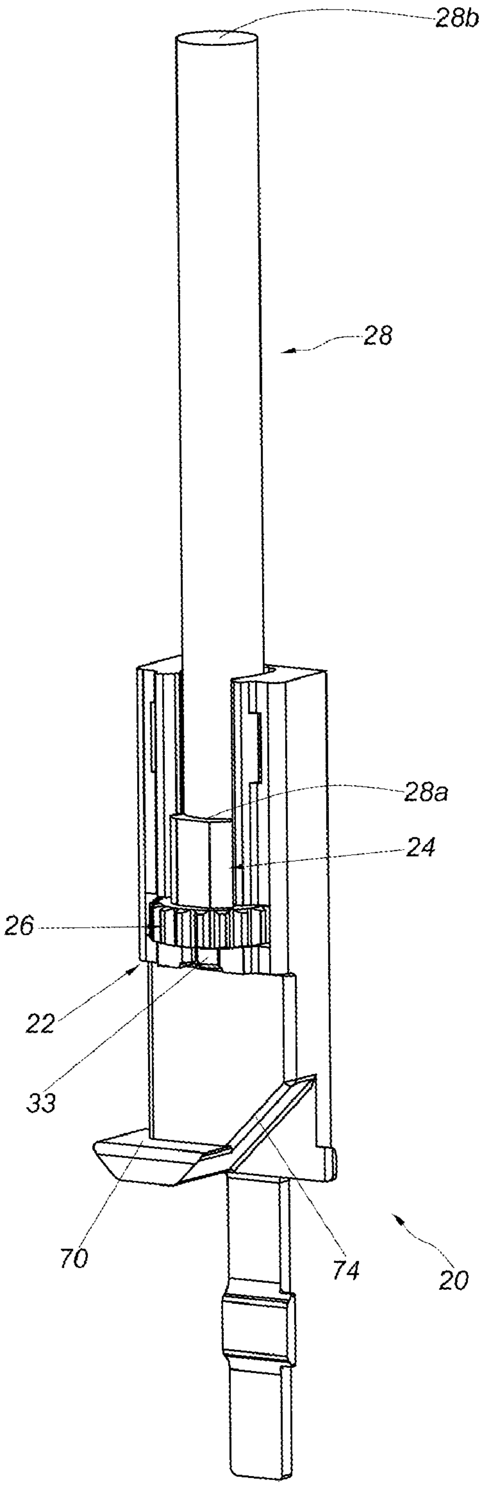
FIG. 1 is a perspective diagram of an adjustment device and a working member according to an embodiment of the present application.
Figure 2:
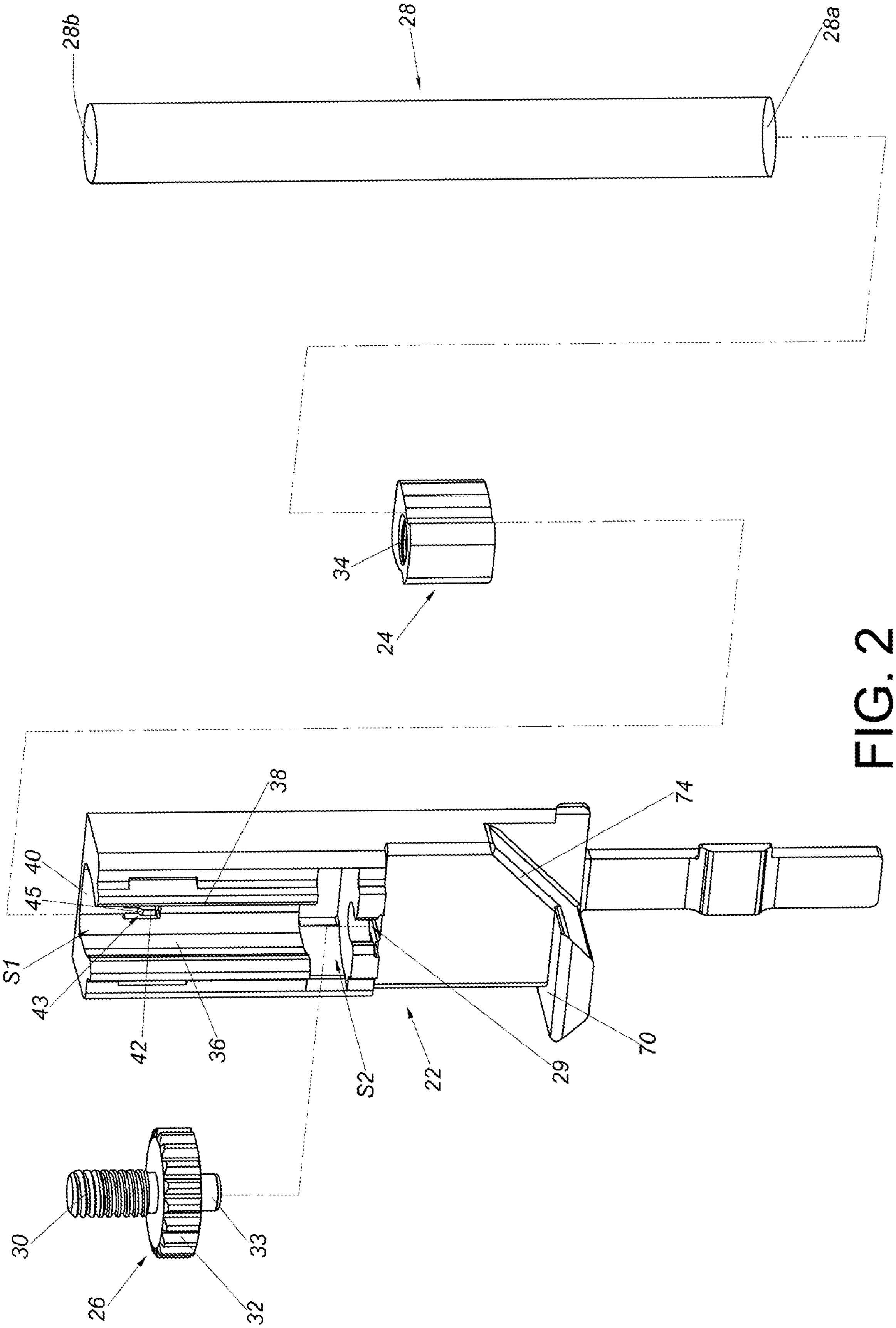
FIG. 2 is an exploded diagram of the adjustment device and the working member according to the embodiment of the present application.

Please refer to FIG. 1 and FIG. 2. In an embodiment of the present application, an adjustment device 20 can include a base 22, a driving member 24 and an adjusting member 26. In this embodiment, the adjustment device 20 can be applied for a working member 28, and the working member 28 can be a rod body; however, application of the working member 28 is not limited to the foresaid embodiment, and depends on a design demand. The adjusting member 26 and/or the driving member 24 can be arranged on the base 22; therefore, in one possible embodiment, the adjusting member 26 and the driving member 24 can be both arranged on the base 22.

Preferably, the base 22 can include a space configured to accommodate the driving member 24 and the adjusting member 26. For example, the space can include a first space portion S1 and a second space portion S2 communicated with each other. The first space portion S1 can be used to accommodate the driving member 24 and a part of the working member 28, such as an end portion or a first end portion **28*a* of the working member 28. The second space portion S2 can be used to accommodate a part of the adjusting member 26**.

Preferably, the first end portion **28*a* of the working member 28 can correspond to or align with the driving member 24; moreover, the first end portion 28*a* of the working member 28 can abut against the driving member 24. In other possible embodiment, the first end portion 28*a* of the working member 28 can be connected with the driving member 24 (such as in a fixed manner). Application of the first end portion 28***a* of the working member 28 and the driving member 24 is not limited to the foresaid embodiments, and depends on the design demand.

Preferably, the adjusting member 26 can be screwed to the driving member 24. For example, the adjusting member 26 can include a connecting portion 30 and an adjusting portion 32, and the adjusting portion 32 can be connected to the connecting portion 30; besides, the driving member 24 can include a corresponding portion 34 configured to be screwed to the connecting portion 30 of the adjusting member 26. For example, the corresponding portion 34 of the driving member 24 and the connecting portion 30 of the adjusting member 26 can have screwed features that can be engaged with each other. The adjusting portion 32 of the adjusting member 26 can be accommodated inside the second space portion S2, and the connecting portion 30 of the adjusting member 26 can be accommodated inside the first space portion S1.

Preferably, the base 22 can further include a mounting portion 29, and the adjusting member 26 can further include a stretching portion 33 configured to pierce through the mounting portion 29. The adjusting portion 32 can be located between the stretching portion 33 and the connecting portion 30.

Preferably, the first space portion S1 can be a channel with a predefined length, and the first space portion S1 can be formed by a first preset wall 36, a second preset wall 38 and a middle wall 40 of the base 22. The middle wall 40 can be located between the first preset wall 36 and the second preset wall 38, and the first preset wall 36 and the second preset wall 38 can be substantially connected to the middle wall 40 in a vertical manner.

Preferably, the base 22 can include at least one constraining portion 42 configured to constrain a movement of the driving member 24, and the at least one constraining portion 42 can be located on one of the first preset wall 36, the second preset wall 38 and the middle wall 40. In one possible embodiment, the at least one constraining portion 42 is located on middle wall 40; however, application of position of the at least one constraining portion 42 is not limited to the foresaid embodiment, and depends on the design demand. The at least one constraining portion 42 can be a protrusion; moreover, the at least one constraining portion 42 can be the protrusion of a resilient arm 43, and the resilient arm 43 can be arranged on the middle wall 40; application of the resilient arm 43 is not limited to the foresaid embodiment, and depends on the design demand.

Figure 5:
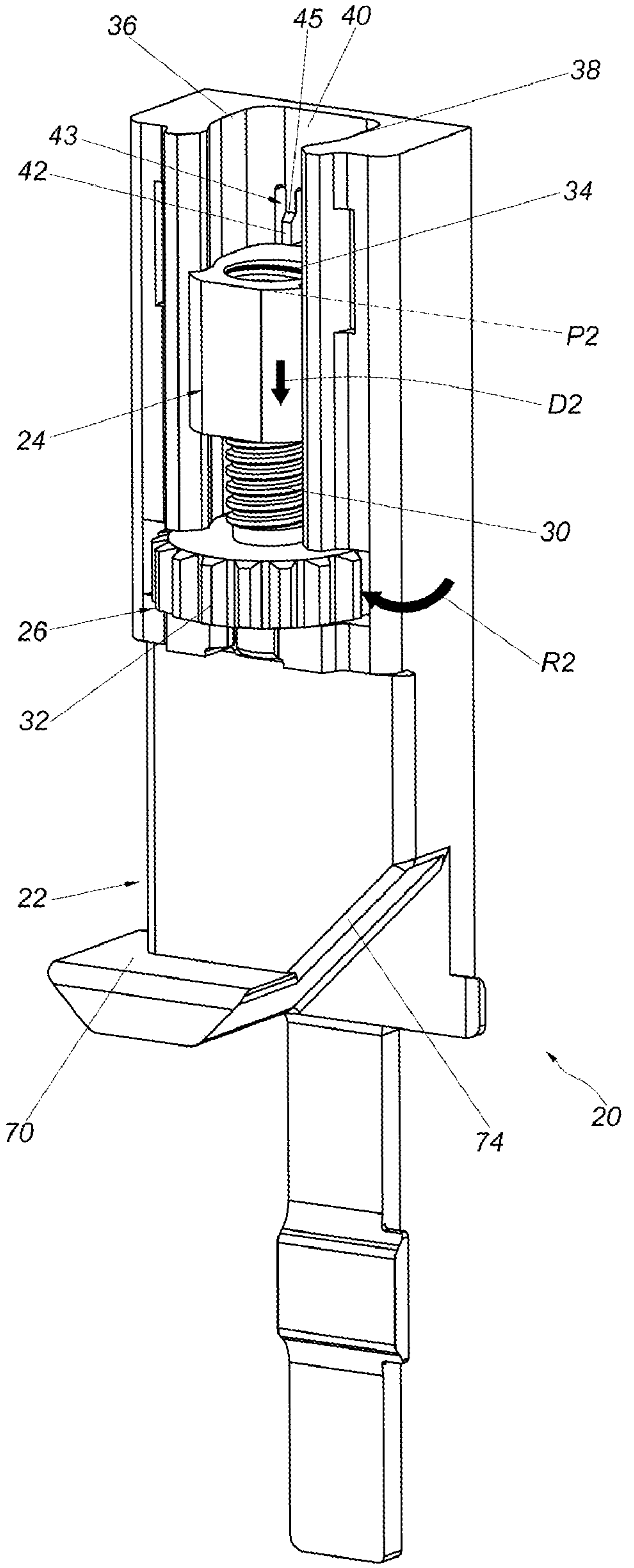
FIG. 5 is a perspective diagram of the adjustment device according to the embodiment of the present application.

Preferably, the resilient arm 43 can further include a guiding section 45, and the guiding section 45 can be an inclined surface or an arc surface, which can be shown in FIG. 5. When the driving member 24 is mounted inside the first space portion S1, the resilient arm 43 can be pressed by the driving member 24 via guide of the guiding section 45, and the resilient arm 43 can store a resilient force; when the driving member 24 is shifted across the resilient arm 43, the resilient force of the resilient arm 43 can be released, and the driving member 24 can be constrained inside the first space portion S1 by the at least one constraining portion 42, so that the driving member 24 can be only allowed to move within a specific range.

Figure 3:
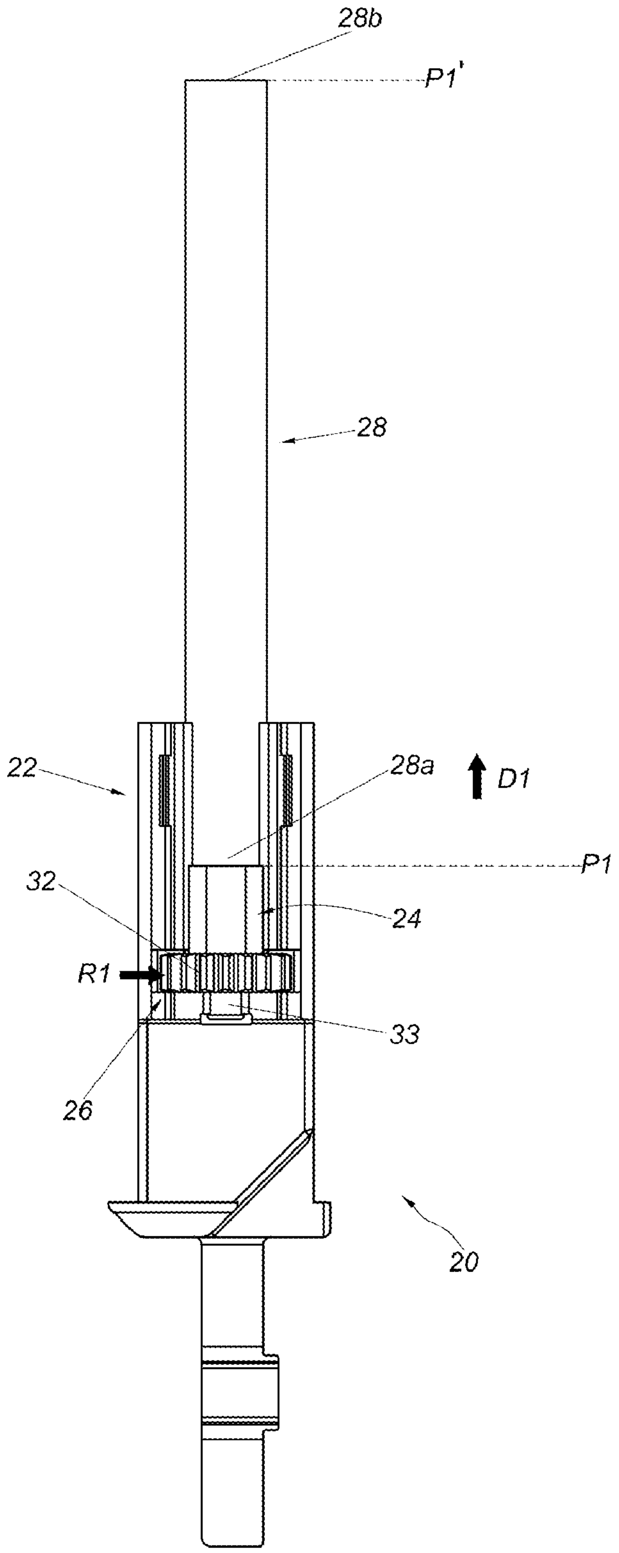
FIG. 3 is an assembly diagram of the adjustment device and the working member according to the embodiment of the present application.
Figure 4:
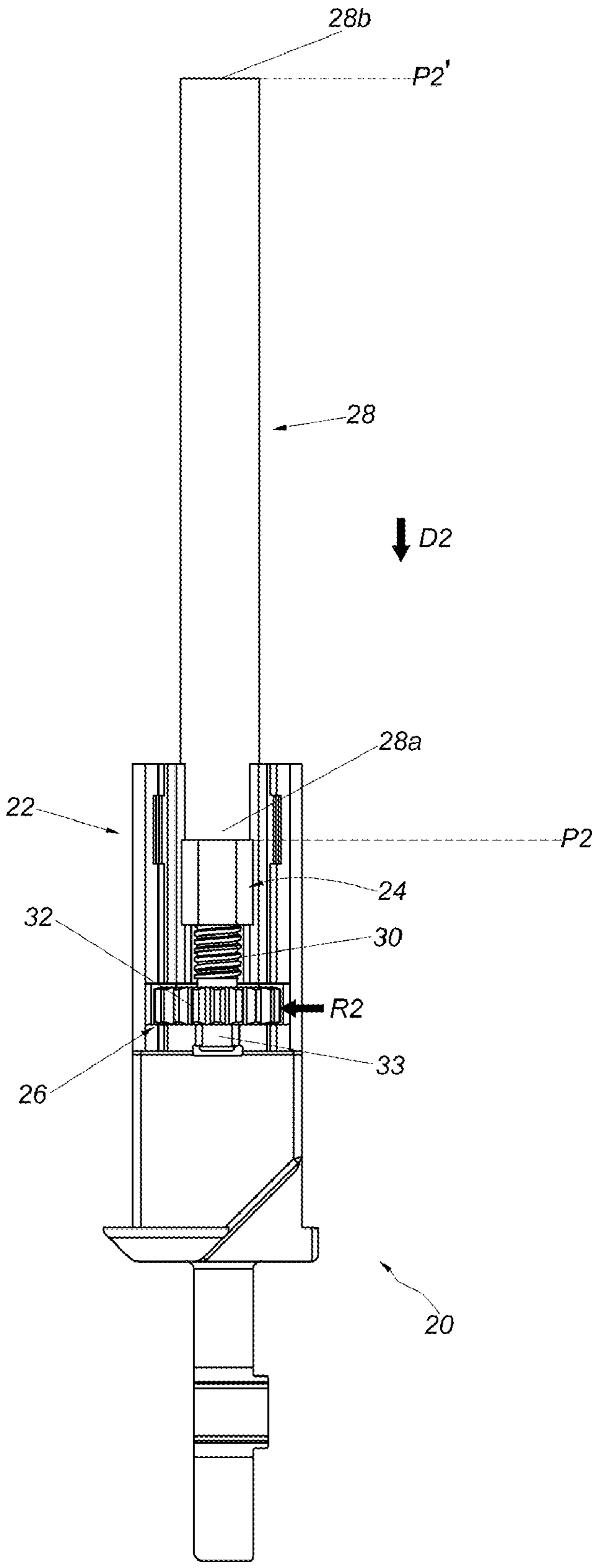
FIG. 4 is a diagram of the adjustment device applied to adjust position of the working member according to the embodiment of the present application.

As shown in FIG. 3 to FIG. 5, the adjusting member 26 can be configured to adjust the movement of the driving member 24. For example, the adjusting member can adjust the movement of the driving member 24 in a rotatable manner. The user can apply a force to the adjusting portion 32, and the adjusting member 26 can be rotated in a first rotation direction R1 and configured to move the driving member 24 with respect to the base 22 from a first preset position P1 (which can be shown in FIG. 3) in a first direction D1, such as moving to a second preset position P2 (which can be shown in FIG. 4 and FIG. 5), so that the working member 28 can be drivable in response to the movement of the driving member 24; for example, the working member 28 can be shifted from a first corresponding position P1' (which can be shown in FIG. 3) to a second corresponding position P2' (which can be shown in FIG. 4). Further, the user can apply another force to the adjusting portion 32, and the adjusting member 26 can be rotated in a second rotation direction R2 opposite to the first rotation direction R1 (which can be shown in FIG. 4 and FIG. 5), so as to move the driving member 24 with respect to the base 22 from the second preset position P2 to the first preset position P1 (which can be shown in FIG. 3) in a second direction D2 opposite to the first direction D1 (which can be shown in FIG. 4 and FIG. 5), and the working member 28 can be shifted from the second corresponding position (which can be shown in FIG. 4) to the first corresponding position (which can be shown in FIG. 3) in response to the movement of the driving member 24.

Preferably, the driving member 24 can be shifted in a linear manner.

Preferably, when the driving member 24 is shifted from the first preset position P1 (which can be shown in FIG. 3) to the second preset position P2 (which can be shown in FIG. 4 and FIG. 5), the at least one constraining portion 42 can be configured to block the driving member 24 at the second preset position P2 (which can be shown in FIG. 5) for constraint effect.

It should be mentioned that the first preset position P1 and the second preset position P2 can be two extreme positions of the driving member 24; moreover, the first preset position P1 and the second preset position P2 can be any two possible positions within an activity range of the driving member 24. Application of the first preset position P1 and the second preset position P2 is not limited to the foresaid embodiment, and depends on the design demand.

Figure 6:
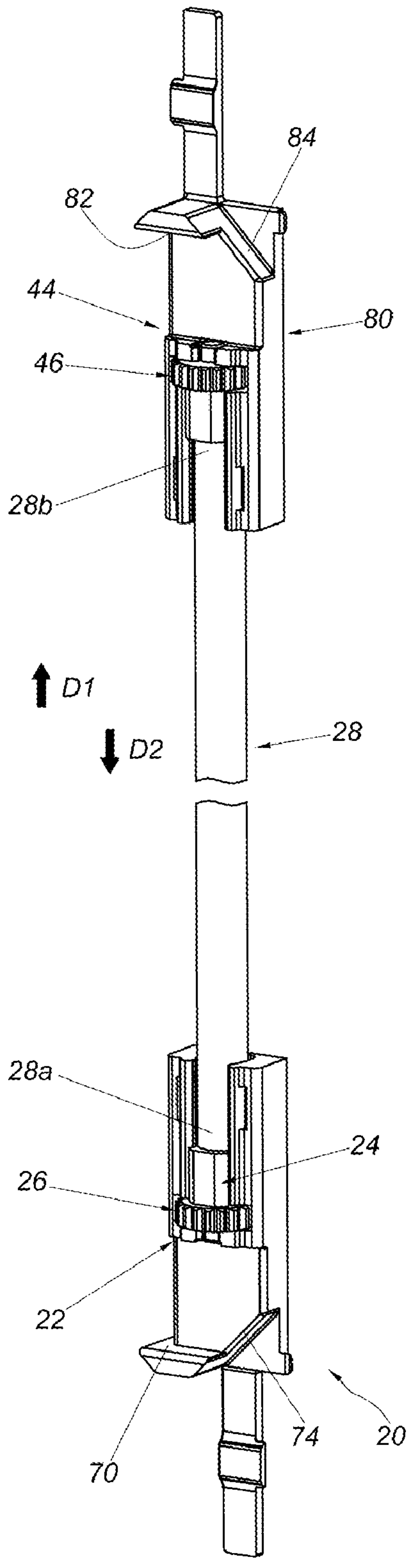
FIG. 6 is a diagram of the working member arranged between the adjustment device and an auxiliary device according to the embodiment of the present application.

As shown in FIG. 6, in another embodiment, the working member 28 can be arranged between the adjustment device 20 and an auxiliary device 44. In addition, the first end portion 28*a* of the working member 28 can be connected to the adjustment device 20, and another end portion or a second end portion 28*b* of the working member 28 can be connected to the auxiliary device 44. Position of the second end portion 28*b* can correspond to position of the first end portion 28*a*. The adjustment device 20 can have structural configuration substantially the same as structural configuration of the auxiliary device 44, and principle of the auxiliary device 44 for moving the working member 28 in the first direction D1 or in the second direction D2 can be substantially the same as principle of the adjustment device 20 for adjusting the working member 28, which can be shown in FIG. 3 and FIG. 4, and therefore a detailed description can be omitted herein for simplicity; that is to say, the auxiliary device 44 can be interpreted as another adjustment device.

According to foresaid description, the user can adjust the working member 28 to move in the first direction D1 or in the second direction D2 via the adjustment device 20 (or the adjusting member 26) arranged on the first end portion 28*a* of the working member 28; further, the user can adjust the working member 28 to move in the first direction D1 or in the second direction D2 via the auxiliary device 44 (or the adjusting member 46) arranged on the second end portion 28*b* of the working member 28, so that the adjustment device 20 and the auxiliary device 44 can have an advantage of convenient operation.

Figure 7:
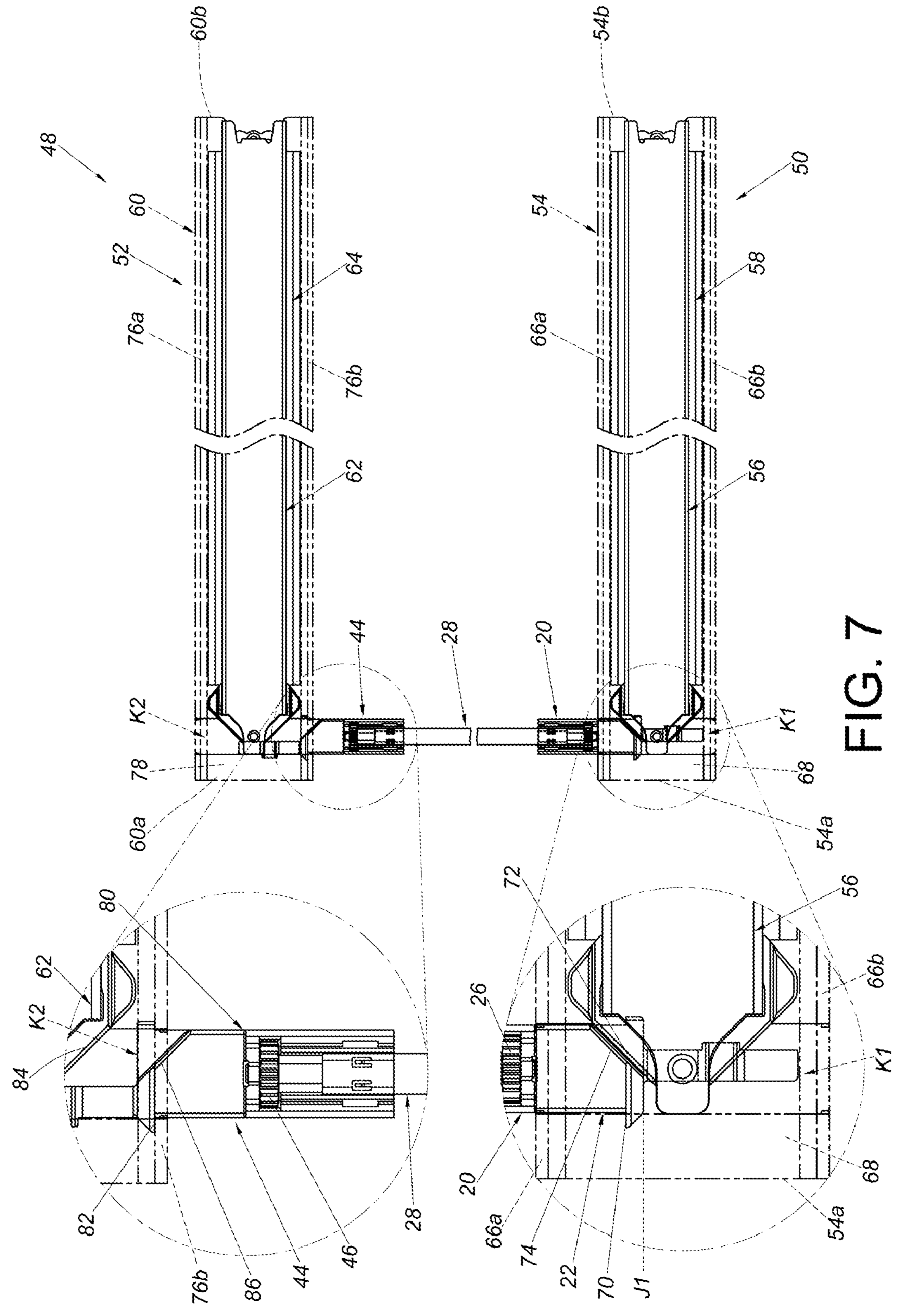
FIG. 7 is a diagram of the adjustment device, the working member and the auxiliary device arranged between two slide rail assemblies according to the embodiment of the present application.

As shown in FIG. 7, the adjustment device 20, the working member 28 and the auxiliary device 44 can be preferably configured to form an interlock mechanism. The interlock mechanism can be applied for the slide rail mechanism 48, and one slide rail assembly of the slide rail mechanism 48 can be locked due to a movement of another slide rail assembly of the slide rail mechanism 48, which means the slide rail mechanism 48 can have an interlock function. The slide rail mechanism 48 can include a first slide rail assembly 50, a second slide rail assembly 52, the adjustment device 20, the working member 28 and the auxiliary device 44.

The first slide rail assembly 50 can include a first rail 54 and a second rail 56, and the second rail 56 can be shiftable with respect to the first rail 54 in a longitudinal direction; preferably, the first slide rail assembly 50 can further include a first middle rail 58 movably mounted between the first rail 54 and the second rail 56.

The second slide rail assembly 52 can include a third rail 60 and a fourth rail 62, and the fourth rail 62 can be shiftable with respect to the third rail 60 in the longitudinal direction; preferably, the second slide rail assembly 52 can further include a second middle rail 64 movably mounted between the third rail 60 and the fourth rail 62.

The adjustment device 20 can be movably mounted on the first slide rail assembly 50. For example, the first rail 54 can include a first wall 66*a*, a second wall 66*b* and a vertical wall 68. The vertical wall 68 can be connected between the first wall 66*a* and the second wall 66*b* of the first rail 54. The first rail 54 can have a first end 54*a* and a second end 54*b*, such as a front end and a rear end, and application of the foresaid ends can depend on the design demand. The first rail 54 can further include a first accommodating space K1 configured to accommodate the adjustment device 20. In one possible example, the first accommodating space K1 can be arranged by the first wall 66*a*, the second wall 66*b* and the vertical wall 68 of the first rail 54, the first accommodating space K1 can be adjacent to the first end 54*a* of the first rail 54, and the adjustment device 20 can be adjacent to the first wall 66*a* of the first rail 54. Preferably, the base 22 of the adjustment device 20 can include a first constraining feature 70 configured to correspond to the first wall 66*a* of the first rail 54, and further to constrain the movement of the adjustment device 20 with respect to the first rail 54 at an extreme position. Preferably, one of the second rail 56 and the adjustment device 20 can include a guiding feature, such as the inclined surface or the arc surface, and application of the guiding feature can depend on the design demand. Therefore, in one possible example, a first guiding feature 72 can be arranged on the second rail 56, and the base 22 of the adjustment device 20 can include a second guiding feature 74.

The auxiliary device 44 can be movably mounted on the second slide rail assembly 52. For example, the third rail 60 can include a first wall 76*a*, a second wall 76*b* and a vertical wall 78. The vertical wall 78 can be connected between the first wall 76*a* and the second wall 76*b* of the third rail 60. The third rail 60 can have a first end 60*a* and a second end 60*b*, such as the front end and the rear end, and application of the foresaid ends can depend on the design demand. The third rail 60 can further include a second accommodating space K2 configured to accommodate the auxiliary device 44. In one possible example, the second accommodating space K2 can be arranged by the first wall 76*a*, the second wall 76*b* and the vertical wall 78 of the third rail 60, the second accommodating space K2 can be adjacent to the first end 60*a* of the third rail 60, and the auxiliary device 44 can be adjacent to the second wall 76*b* of the third rail 60. Preferably, the base 80 of the auxiliary device 44 can include a second constraining feature 82 configured to correspond to the second wall 76*b* of the third rail 60, and further to constrain the movement of the auxiliary device 44 with respect to the third rail 60 at the extreme position. Preferably, one of the fourth rail 62 and the auxiliary device 44 can include the guiding feature, such as the inclined surface or the arc surface, and application of the guiding feature can depend on the design demand. Therefore, in one possible example, a third guiding feature 84 can be arranged on the fourth rail 62, and the base 80 of the auxiliary device 44 can include a fourth guiding feature 86.

When the first slide rail assembly 50 and the second slide rail assembly 52 are both set in the retracted mode, the interlock mechanism can be located at a first position J1. Further, when the second rail 56 is set in the retracted position with respect to the first rail 54, and the fourth rail 62 is set in the retracted position with respect to the third rail 60, the interlock mechanism can be located at the first position J1; in the meantime, the fourth rail 62 of the second slide rail assembly 52 is not blocked by the auxiliary device 44.

Figure 8:
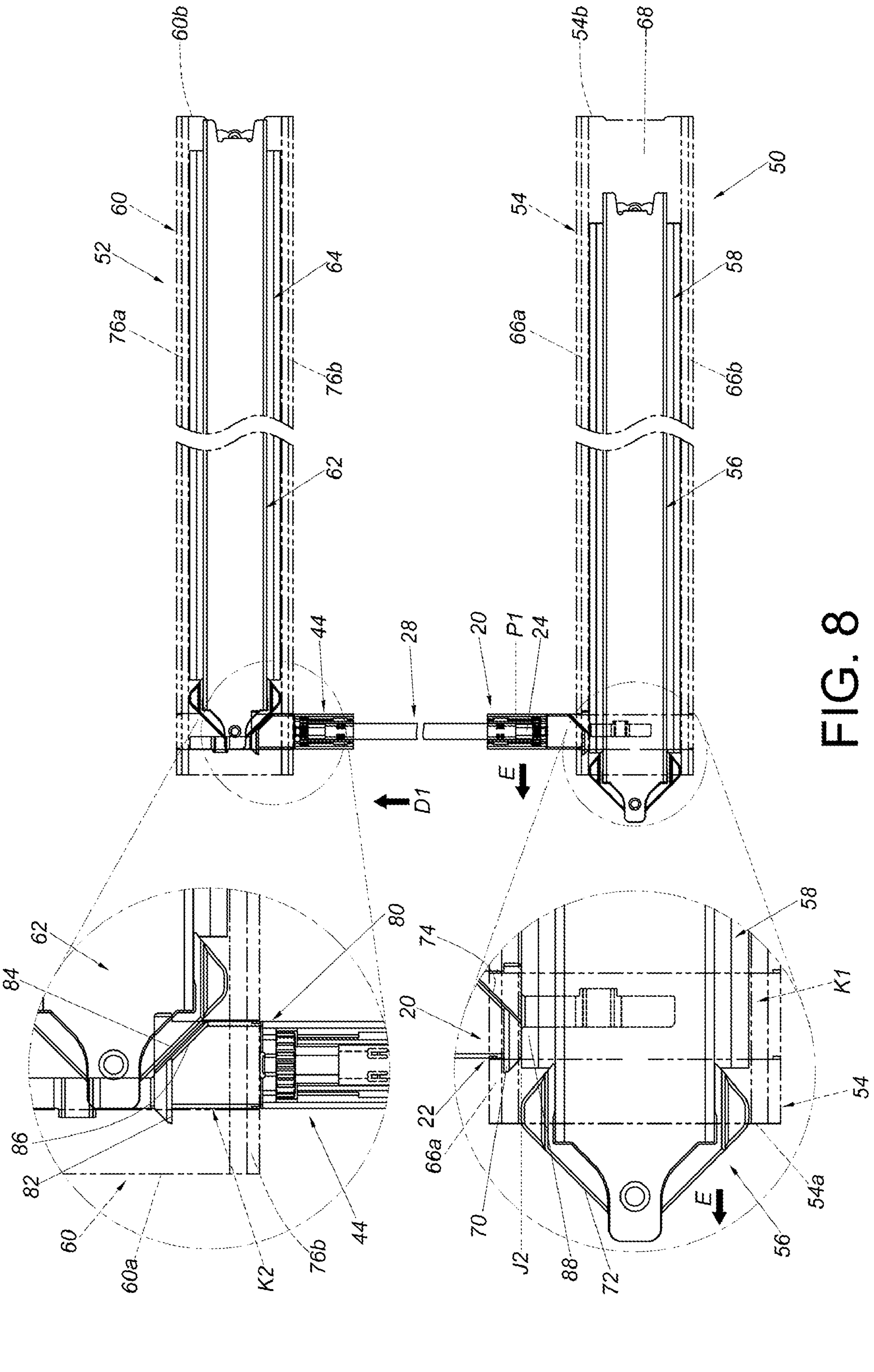
FIG. 8 is a diagram of a movable rail of one of the two slide rail assemblies being locked by the adjustment device, the working member and the auxiliary device in response to a movable rail of another slide rail assembly in a pulled-open mode according to the embodiment of the present application.

As shown in FIG. 7 and FIG. 8, when the second rail 56 is shifted with respect to the first rail 54 in an actuation direction E, the adjustment device 20 and the working member 28 and the auxiliary device 44 are linked for utilizing the auxiliary device 44 to block the fourth rail 62 (which can be shown in FIG. 8), so as to prevent the fourth rail 62 from being shifted with respect to the third rail 60 in the actuation direction E.

Moreover, when the second rail 56 is shifted with respect to the first rail 54 from the retracted position in the actuation direction E, the first guiding feature 72 of the second rail 56 can abut against the adjustment device 20 (such as abutting against the second guiding feature 74) to generate a force for driving the adjustment device 20, the working member 28 and the auxiliary device 44 from the first position J1 (which can be shown in FIG. 7) to a second position J2 (which can be shown in FIG. 8) in the first direction D1. The auxiliary device 44 and the fourth rail 62 can be blocked by each other at the second position J2, for example, the fourth guiding feature 86 of the auxiliary device 44 can be configured to block the third guiding feature 84 of the fourth rail 62, so as to prevent the fourth rail 62 from being shifted with respect to the third rail 60 from the retracted position in the actuation direction E.

Preferably, the second rail 56 (or a wall 88 of the first middle rail 58) can be configured to hold the adjustment device 20 and further to keep the interlock mechanism at the second position J2 (which can be shown in FIG. 8), and therefore the fourth guiding feature 86 of the auxiliary device 44 can be used to block the third guiding feature 84 of the fourth rail 62.

Figure 9:
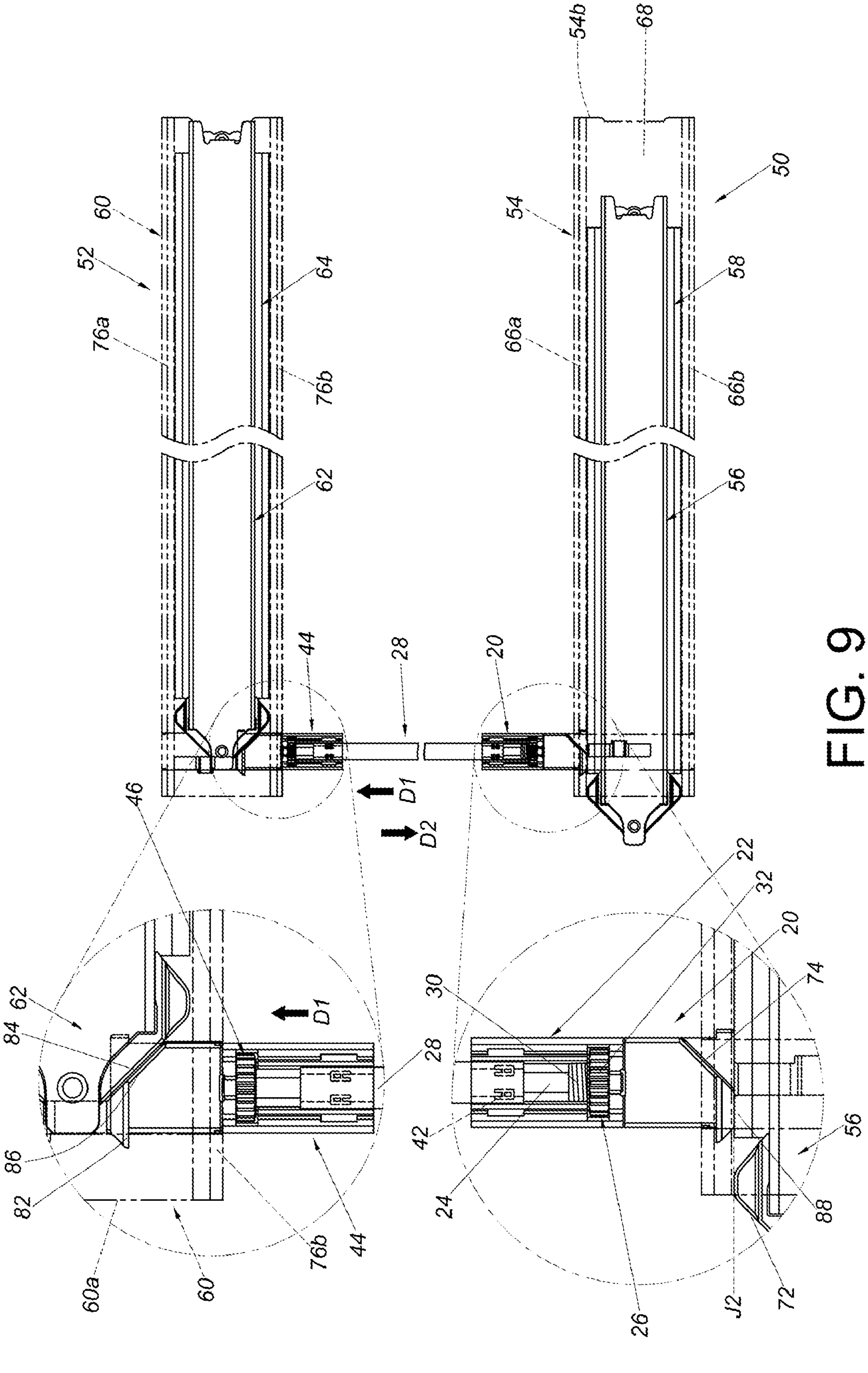
FIG. 9 is a diagram of the position of the working member being adjusted by the adjustment device arranged between the two slide rail assemblies according to the embodiment of the present application.

As shown in FIG. 8 and FIG. 9, in order to avoid locking quality of the interlock mechanism applied to rails of the slide rail assembly from being affected by length tolerance of the working member 28, the adjustment device 20 (or the auxiliary device 44) of the embodiment can have an adjustment mechanism configured to adjust the movement of the working member 28 for eliminating tolerance effect.

Moreover, the working member 28 can be drivable in response to the movement of the adjusting member 26 of the adjustment device 20. For example, the user can apply the force to the adjusting portion 32 of the adjusting member 26, for adjusting the movement of the driving member 24 with respect to the base 22. In one possible embodiment, the driving member 24 can be shifted from the first preset position P1 (which can be shown in FIG. 8) in the first direction D1 (which can be shown in FIG. 9), and the working member 28 can be shifted from the first corresponding position in the first direction D1, so that the auxiliary device 44 and the fourth rail 62 can be blocked by each other more tightly. For example, comparing to the embodiment in FIG. 8, the fourth guiding feature 86 of the auxiliary device 44 (which is shown in FIG. 9) can be near to the third guiding feature 84 of the fourth rail 62; besides, the user may apply another force to the adjusting portion 32 of the adjusting member 26 for adjusting the movement of the driving member 24 with respect to the base 22 in the second direction D2, and the working member 28 can be shifted in the second direction D2, so that contact between the auxiliary device 44 and the fourth rail 62 can be gradually weakened. For example, comparing to the embodiment in FIG. 9, the fourth guiding feature 86 of the auxiliary device 44 (which is shown in FIG. 8) can be distant from the third guiding feature 84 of the fourth rail 62. Therefore, the interlock mechanism of the present application can be more reliable due to foresaid description.

It should be mentioned that when the second rail 56 of the first slide rail assembly 50 is shifted from the retracted position in the actuation direction E, the fourth rail 62 of the second slide rail assembly 52 can be blocked by the auxiliary device 44, so as to prevent the fourth rail 62 from being shifted with respect to the third rail 60 from the retracted position in the actuation direction E. Moreover, when the first slide rail assembly 50 and the second slide rail assembly 52 are both set in the retracted mode (which can be shown in FIG. 7), and the fourth rail 62 is shifted with respect to the third rail 60 of the second slide rail assembly 52 from the retracted position in the actuation direction E, the auxiliary device 44 of the interlock mechanism which is located at the first position J1 can be pressed by the fourth rail 62 (or the second middle rail 64) of the second slide rail assembly 52, so that the second rail 56 (or the related first guiding feature 72) of the first slide rail assembly 50 can be blocked by the adjustment device 20 (or the related second guiding feature 74), so as to prevent the second rail 56 from being shifted with respect to the first rail 54 from the retracted position in the actuation direction E. In addition, the user can utilize the auxiliary device 44 (or the related adjusting member 46) to adjust the movement of the working member 28, so as to accordingly adjust tightness between the adjustment device 20 (or the related second guiding feature 74) and the second rail 56 (or the related first guiding feature 72), for making the interlock mechanism more reliable in the same way as mentioned above; thus, the detailed description is omitted herein for simplicity.

Figure 10:
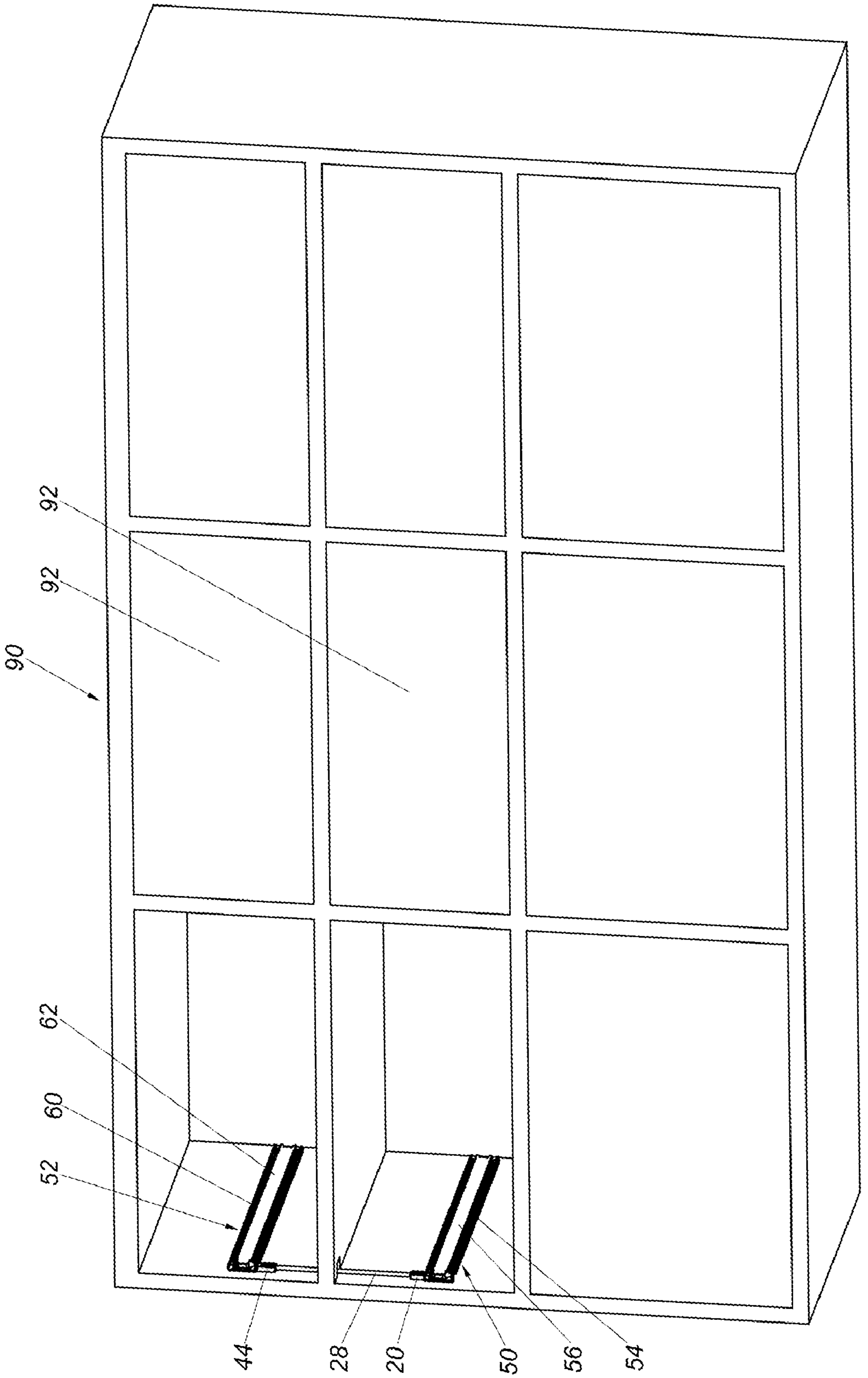
FIG. 10 is a diagram of the two slide rail assemblies, the adjustment device, the working member and the auxiliary device applied to a cabinet according to the embodiment of the present application.

As shown in FIG. 10, the first slide rail assembly 50 and the second slide rail assembly 52 can be arranged on a cabinet 90. The cabinet 90 can include a plurality of holders 92 (such as drawers). The first rail 54 of the first slide rail assembly 50 can be fixed onto the cabinet 90, and the second rail 56 can be configured to hold a first holder (such as a first drawer not shown in the figures). The third rail 60 of the second slide rail assembly 52 can be fixed onto the cabinet 90, and the fourth rail 62 can be configured to hold a second holder (such as a second drawer not shown in the figures).

The adjustment device 20, the working member 28 and the auxiliary device 44 can be located between the first slide rail assembly 50 and the second slide rail assembly 52 for operation of the interlock mechanism, and one of the adjustment device 20 and the auxiliary device 44 can be configured to adjust the movement of the working member 28; principle of the foresaid members is disclosed in FIG. 7 to FIG. 9, and the detailed description is omitted herein for simplicity.

The adjusting member 26 of the adjustment device 20 (or the adjusting member 46 of the auxiliary device 44) can be configured to adjust the movement of the working member 28, so as to avoid functional quality of the interlock mechanism from being affected by the length tolerance of the working member 28, or further to adjust the tightness between the interlock mechanism and the slide rail assembly that is blocked by each other; it is to say, product quality of the interlock mechanism and the slide rail assembly can be improved accordingly.

In conclusion, the slide rail mechanism and the adjustment device provided by the embodiment of the present application can have following advantages:

1. The adjustment device 20 has merits of simple structure and easy operation, and can be used to adjust the movement of the working member 28.

2. The working member 28 and the adjustment device 20 (preferably including the auxiliary device 44) can be defined as the interlock mechanism, and the interlock mechanism can be applied for two slide rail assemblies. For example, when the second rail 56 (or the first holder) of the first slide rail assembly 50 is pulled open with respect to the first rail 54, the interlock mechanism can be used to prevent the fourth rail 62 (or the second holder) of the second slide rail assembly 50 from being shifted with respect to the third rail 60.

3. The working member 28 can be arranged between the adjustment device 20 and the auxiliary device 44; preferably, the adjustment device 20 can have the structural configuration similar to the structural configuration of the auxiliary device 44. The adjusting member 26 of the adjustment device 20 (or the adjusting member 46 of the auxiliary device 44) can be used to adjust the movement of the working member 28, so as to avoid the functional quality of the interlock mechanism from being affected by the length tolerance of the working member 28, or further to adjust the tightness between the interlock mechanism and the slide rail assembly that is blocked by each other; it is to say, the product quality of the interlock mechanism and the slide rail assembly can be improved accordingly.

4. The space (such as the first space portion S1) of the base 22 can be configured to accommodate the driving member; the base 22 can further include a resilient arm 43, and the at least one constraining portion 42 can be arranged on the resilient arm 43; the at least one constraining portion 42 can be configured to constrain the driving member 24 inside the space (such as the first space portion S1).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustment device comprising:

a base;

a driving member arranged on the base; and an adjusting member arranged on the base and configured to adjust a movement of the driving member;

wherein the base comprises a space configured to accommodate the driving member and the adjusting member;

wherein the space comprises a first space portion configured to accommodate the driving member;

wherein the base further comprises a resilient arm, at least one constraining portion is arranged on the resilient arm, the driving member is constrained inside the first space portion by the at least one constraining portion;

wherein the space further comprises a second space portion communicated with the first space portion and configured to accommodate a part of the adjusting member, a guiding section is arranged on a side of the at least one constraining portion away from the second space portion, the driving member is configured to abut against the guiding section to resiliently deform the resilient arm for allowing the driving member to be accommodated in the first space portion by passing through an opening of the first space portion away from the second space portion along a direction from the first space portion toward the second space portion.

2. The adjustment device of claim 1, wherein the adjusting member adjusts the movement of the driving member in a rotatable manner.

3. The adjustment device of claim 2, wherein the driving member is shifted with respect to the base in a linear manner.

4. The adjustment device of claim 3, wherein the adjusting member is screwed to the driving member.

5. The adjustment device of claim 3, wherein when the driving member is shifted from a first preset position to a second preset position, the driving member is blocked by the at least one constraining portion at the second preset position.

6. The adjustment device of claim 1, wherein the adjustment device is applied to a working member, and the working member is drivable is response to the movement of the driving member.

7. The adjustment device of claim 6, wherein the working member is a rod body and comprises a first end portion and a second end portion opposite to each other, the first end portion is connected to the adjustment device, the second end portion is connected to an auxiliary device, the adjustment device has structural configuration substantially the same as structural configuration of the auxiliary device.

8. A slide rail mechanism comprising:

a first slide rail assembly comprising a first rail and a second rail, the second rail being shiftable with respect to the first rail;

a second slide rail assembly comprising a third rail and a fourth rail, the fourth rail being shiftable with respect to the third rail;

an adjustment device movably mounted on the first slide rail assembly;

an auxiliary device movably mounted on the second slide rail assembly; and a working member arranged between the adjustment device and the auxiliary device;

wherein when the second rail is shifted with respect to the first rail in an actuation direction, the adjustment device and the working member and the auxiliary device are linked for utilizing the auxiliary device to block the fourth rail, so as to prevent the fourth rail from being shifted with respect to the third rail in the actuation direction;

wherein one of the adjustment device and the auxiliary device comprises a base, an adjusting member arranged on the base, and a driving member arranged on the base, and the working member is drivable in response to adjustment of the adjusting member;

wherein the base comprises a space configured to accommodate the driving member and the adjusting member;

wherein the space comprises a first space portion configured to accommodate the driving member;

wherein the base further comprises a resilient arm, at least one constraining portion is arranged on the resilient arm, the driving member is constrained inside the first space portion by the at least one constraining portion;

wherein the space further comprises a second space portion communicated with the first space portion and configured to accommodate a part of the adjusting member, a guiding section is arranged on a side of the at least one constraining portion away from the second space portion, the driving member is configured to abut against the guiding section to resiliently deform the resilient arm for allowing the driving member to be accommodated in the first space portion by passing through an opening of the first space portion away from the second space portion along a direction from the first space portion toward the second space portion.

9. The slide rail mechanism of claim 8, wherein the working member comprises a first end portion and a second end portion opposite to each other, the first end portion is connected to the adjustment device, and the second end portion is connected to the auxiliary device.

10. The slide rail mechanism of claim 8, wherein the adjusting member adjusts the movement of the driving member in a rotatable manner.

11. The slide rail mechanism of claim 10, wherein the driving member is shifted with respect to the base in a linear manner.

12. The slide rail mechanism of claim 11, wherein the adjusting member is screwed to the driving member.

13. The slide rail mechanism of claim 11, wherein when the driving member is shifted from a first preset position to a second preset position, the driving member is blocked by the at least one constraining portion at the second preset position.

* * * * *